March 7, 1933.  E. A. LOUDER  1,900,509
PROCESS FOR STERILIZATION OF LIQUIDS
Filed Oct. 30, 1930
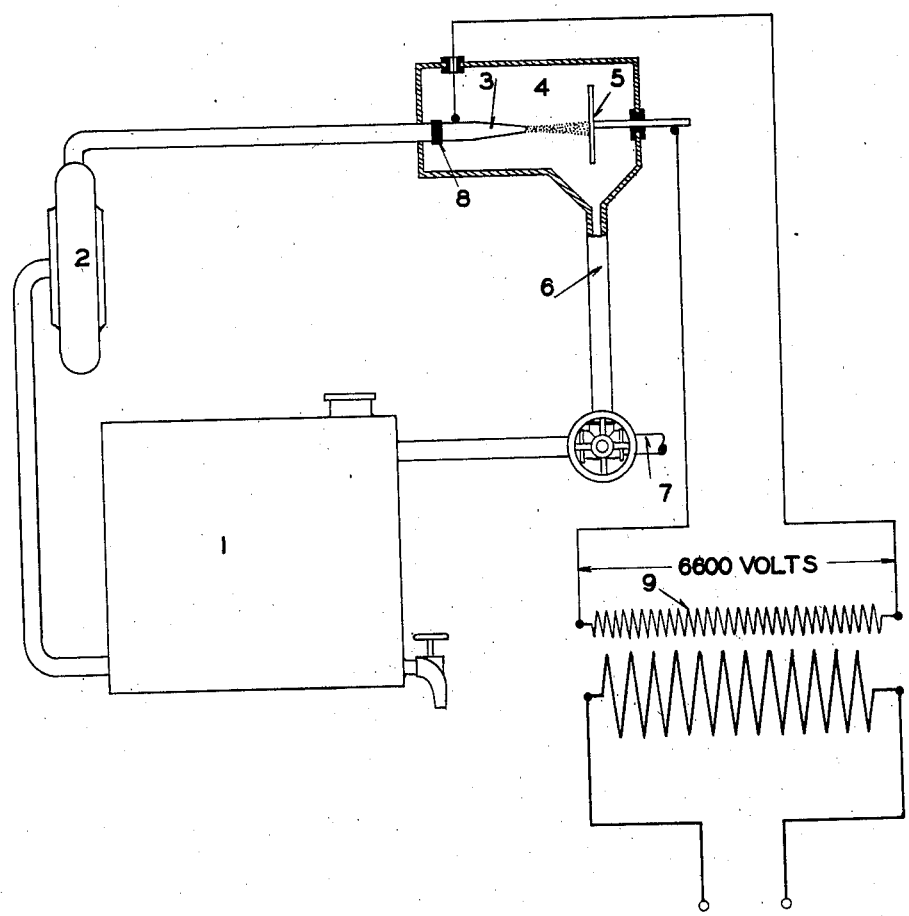
Inventor
EARL A. LOUDER
By *E. C. Huffman*
Att'y.

Patented Mar. 7, 1933

1,900,509

UNITED STATES PATENT OFFICE

EARL A. LOUDER, OF GREENVILLE, ILLINOIS, ASSIGNOR TO PET MILK COMPANY, OF ST. LOUIS, MISSOURI, A CORPORATION OF DELAWARE

PROCESS FOR STERILIZATION OF LIQUIDS

Application filed October 30, 1930. Serial No. 492,209.

My invention relates to an electrical method for sterilization of liquids, one application being the destruction of bacteria in milk. It has heretofore been proposed to sterilize milk by the use of electricity but these methods have not been effective for the purpose except when electricity was so utilized as to heat the milk either by means of electrically heated elements or by the heat resulting from the conduction through the milk of currents of relatively high amperage. Since electrical heating is uneconomical the methods referred to have not been of substantial commercial value.

That the mere passage of low amperage currents through milk does not destroy bacteria may be due to the fact that most forms of bacteria are not affected by the presence of such currents, and that many of the bacteria are protected by the non-conductive fat content of the milk. I have found, however, that economical sterilization of milk can be secured by the utilization of the method hereinafter described and wherein I believe that high tension spark discharge is produced between particles of the milk and the electrode upon which they are caused to impinge.

In the drawing, which diagrammatically illustrates an apparatus for carrying out my invention, 1 represents a milk storage tank from which, by means of pump 2, milk is delivered under pressure to the nozzle 3 in the sterilization chamber 4 and by means of the nozzle, the milk is directed in a horizontal stream against the plate 5 from which it falls and is conveyed, by pipe 6, either to the storage tank or to draw-off pipe 7, as may be desired.

The nozzle 3 is insulated as at 8 from the supply pipe and is connected to one terminal of the secondary 9 of a high voltage transformer, the other terminal being connected to the baffle plate 5 against which the stream of milk is directed. In tests of my process I have found that with a nozzle opening 1/32 of an inch, a gap of 6 inches between the nozzle and the electrode 5, a difference of potential of 6600 volts between the electrodes 3 and 5, and a pressure of two pounds per square inch on the milk as delivered to the nozzle,—sterilization of the milk to the degree carried out in ordinary commercial pasteurization processes for fresh milk is secured by one passage of the milk between the electrodes. With the apparatus illustrated, however, it is possible to re-circulate milk across the electrode gap as often as may be necessary to secure the desired degree of purification.

While I do not desire to be bound by a particular theory, it is visually apparent, in the operation of the apparatus above described, that a " corona " or brush discharge occurs around the stream of milk adjacent the baffle plate 5, and I believe that indicates that there are constant minute spark discharges from and through the milk to the plate electrode 5 from points removed short distances from the electrode whereby a large part of the milk, while adjacent the plate, is subjected to spark discharges which mechanically or electrically or thermally, or by a combination of one or more of these effects, achieves the destruction of the bacteria. Possibly electrical discharge through the milk from a point slightly removed from the electrode 5 to that electrode, is facilitated by the partial separation of the milk into spray form whereby air spaces between milk particles form small spark gaps; and I further believe that rebound of the milk particles from the plate after they strike it produces sparking gaps between them and the plate.

In tests of the particular apparatus above described, the current through the secondary circuit of the transformer was approximately one-half ampere. The temperature of the milk was raised only approximately 20 degrees above the temperature of approximately 50 degrees at which it was delivered and while, therefore, the temperature of the whole of the milk was not raised to a sterilization point, it is probable that the spark heat did produce a sterilization temperature in localized areas subjected to it. However, I have not limited the scope of protection claimed to such principle of operation, since the spark discharges may also act mechanically by means of their disruptive effects to kill bacteria.

Since, by my method milk can be passed through a sterilizing chamber at as rapid a rate as normally employed in filling milk containers for retail distribution, it will be apparent that my process constitutes a convenient and economical pasteurization method.

Having fully described my invention, what I claim as new and desire to secure by Letters Patent of the United States is:

1. The method of sterilizing a liquid which comprises continuously projecting a stream of the liquid against a surface and maintaining sufficient difference of potential between said stream and said surface to maintain electric sparking in the zone of initial contact of the liquid with said surface.

2. The method of sterilizing milk which comprises projecting the milk in a stream across the gap between two electrodes, and maintaining said electrodes at a high difference of potential of not less than approximately six thousand volts, the stream having such velocity and dimensions in relation to the voltage employed as to transmit a current of approximately one-half ampere.

3. The process of sterilizing milk which comprises applying pressure to continuously project an unconfined stream thereof in a non-vertical direction from one electrode against another, said electrodes being maintained at sufficiently high difference of potential to cause spark discharges between particles of the milk and the electrode upon which they impinge.

In testimony whereof, I hereunto affix my signature, this 27 day of October, 1930.

EARL A. LOUDER.